United States Patent [19]

Ino et al.

[11] Patent Number: 5,218,789
[45] Date of Patent: Jun. 15, 1993

[54] METHOD FOR IMPROVING UNIFORMITY LEVEL OF A TIRE

[75] Inventors: Kiyoshi Ino; Hiroyuki Tanizawa, both of Toyota, Japan

[73] Assignee: Sumitomo Rubber Industries Limited, Hyogo, Japan

[21] Appl. No.: 871,489

[22] Filed: Apr. 21, 1992

[30] Foreign Application Priority Data

Apr. 25, 1991 [JP] Japan .................. 3-095152

[51] Int. Cl.$^5$ .................. B24B 49/00; B24B 1/00
[52] U.S. Cl. .................. 51/165 R; 51/165.74; 51/281 R; 51/DIG. 33
[58] Field of Search .................. 51/281 R, 289 R, 165 R, 51/165.71, 165.76, 165.74, 326, 327, DIG. 33

[56] References Cited

U.S. PATENT DOCUMENTS

| | | | |
|---|---|---|---|
| 3,739,533 | 6/1973 | Iida et al. .................. | 51/165 R |
| 3,866,360 | 2/1975 | Monajjem .................. | 51/281 R |
| 3,946,527 | 3/1976 | Beer .................. | 51/DIG. 33 |
| 4,047,338 | 9/1977 | Gormish et al. .................. | 51/165 R |
| 4,095,374 | 6/1978 | Ugo .................. | 51/165 R |
| 4,112,630 | 9/1978 | Brown, Jr. .................. | 51/281 R |
| 4,912,882 | 4/1990 | Makino et al. .................. | 51/165 R |
| 5,022,186 | 6/1991 | Rogers, Jr. .................. | 51/281 R |

*Primary Examiner*—Bruce M. Kisliuk
*Assistant Examiner*—Bryan Reichenbach
*Attorney, Agent, or Firm*—Birch, Stewart, Kolasch & Birch

[57] ABSTRACT

A method for improving uniformity level of a tire having a plurality of projections over a surface thereof includes the steps of measuring a variation in lateral force exerted on a contact are a of the tire while the tire is rotated in at least one of a normal direction and a reverse direction, determining two regions at a tire surface, one region including at least one position where the lateral force variation becomes maximum and the other region including at least one position where the lateral force variation becomes minimum based on the measurement result, and scouring over the determined two regions on at least one of the projections for each half part of the tire surface divided by the center line thereof, which satisfies the following conditions: 1) located on the side of the tire surface corresponding to a first direction in which the lateral force varies, and 2) located neither on a center line of a tire tread nor most outwardly with respect to the center line of the tire tread. According to this method, a lateral force variation of the tire can be reduced more effectively than according to the conventional method almost without changing a radial force variation of the tire.

19 Claims, 5 Drawing Sheets

METHOD FOR IMPROVING UNIFORMITY LEVEL OF A TIRE

FIELD OF THE INVENTION

1. Background of the Invention

This invention relates to a method for improving a surface uniformity level of a tire and, more particularly to a method for reducing a lateral force variation working on a contact area of a rotating tire.

2. Description of Related Art

It is generally known that a tire rotates while being deflected from loads applied thereto. However, in the case where the rigidity of the tire is unbalanced due to local differences in the thickness of tread rubber of the tire or a carcass having a seam, a deflecting amount of the tire in response to the loads tends to vary, causing vibrations when an axle of a vehicle shakes.

The variation in the rigidity is divided into three components; a radial force variation (RFV), a lateral force variation (LFV), and a tangential force variation (TFV). Accordingly, it is possible to improve a surface uniformity level of the tire by reducing these variations.

There are known methods for reducing the LFV, out of these variations, such as the one disclosed in Unexamined Japanese Patent Publication No. 56-44819. According to this method, a lateral force generated while a tire is rotated is measured, and the surface of the tire is buffed according to the measured lateral force. The surface of the tire is scoured by 0 mm on a center line of the tread and by 0.3 mm to 0.8 mm on outermost ribs at the shoulders with respect to the center line of the tire as a result of buffing.

Further, there has also been known a method for reducing the LFV of the tire not by buffing the tread entirely over its width as described above, but by buffing only shoulders of the tread.

The method disclosed in the foregoing publication is time-consuming since the tread of the tire is buffed entirely over its width, which consequently causes an increase in production costs of tires. Also, in the case where the LFV is corrected using this method after correction of the RFV, the previously corrected RFV may increase as a result of the correction of the LFV. In the worst case, the RFV may have to be corrected again. The phenomenon that the RFV increases as a result of correction of the LFV also occurs when the latter method is adopted by which only the shoulders of the tread are buffed.

SUMMARY OF THE INVENTION

It is an object of the invention to provide a method for improving a surface uniformity level of a tire which is capable of effectively reducing a lateral force variation almost without changing a radial force variation by scouring a minimum possible area of a tread.

Accordingly, the invention is directed to a method for improving a surface uniformity level of a tire having a plurality of projections over a surface thereof, the method comprising the steps of measuring a variation in lateral force exerting on a contact area of the tire while the tire is rotated in at least one of a forward direction and a reverse direction, determining two regions at a tire surface, one region including at least one position where the lateral force variation becomes maximum and the other region including at least one position where the lateral force variation becomes minimum based on the measurement result, and scouring over the determined two regions on at least one of the projections for each half part of the tire surface divided by the center line thereof, which satisfies the following conditions: 1) located on the side of the tire surface corresponding to a first direction in which the lateral force varies, and 2) located between a center line of a tire tread and an outermost periphery of the tire tread.

These and other objects, features and advantages of the present invention will become more apparent upon a reading of the following detailed description and accompanying drawings.

DETAILED DESCRIPTION OF PREFERRED EMBODIMENTS OF THE INVENTION

An example of a method embodying the invention will be described with reference to the drawings.

Figure 1:
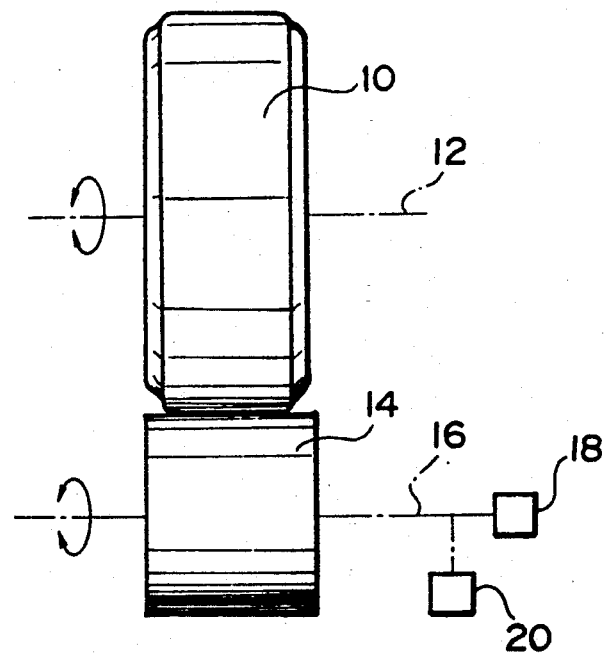
FIG. 1 is a diagram showing an entire construction of an apparatus for measuring an LFV of a tire used in a method in accordance with the invention.

In improving the uniformity level of a tire, an LFV and and RFV of the tire are first detected over the surface thereof in a circumferential direction by an apparatus, for example, as shown in FIG. 1. It may be sufficient to detect only the LFV of the tire as far as the present invention is concerned.

In FIG. 1, a tire 10 is rotatably supported by a rotatable shaft 12, and driven to rotate in forward and reverse directions by an unillustrated driving device. A measuring drum 14 is disposed in such a position as to make contact with the tire 10, and rotatable about a rotatable shaft 16 in synchronism with the tire 10. While the tire 10 is rotated, the lateral force (force working in a horizontal direction in FIG. 1) and radial force (force working in a vertical direction in FIG. 1) exerted on the measuring drum 14 and rotatable shaft 16 are respectively detected by a lateral force load cell 18 and a radial force load cell 20.

With the apparatus thus constructed, the tire 10 is actually rotated in the forward and reverse directions, and detection signals from the load cells 18, 20 at this time are read. A relationship between an angular position of the tire and the RFV, LFV thereof is obtained based on the read detection signals before the correction. The angular position refers to a position on the surface of the tire relative to a reference position, and is indicated by the angle it makes with the reference position with respect to a center of the tire. The RFV is reduced on the basis of the measurement result using a known method, and then the LFV is reduced in the manner described below.

Figure 2A:
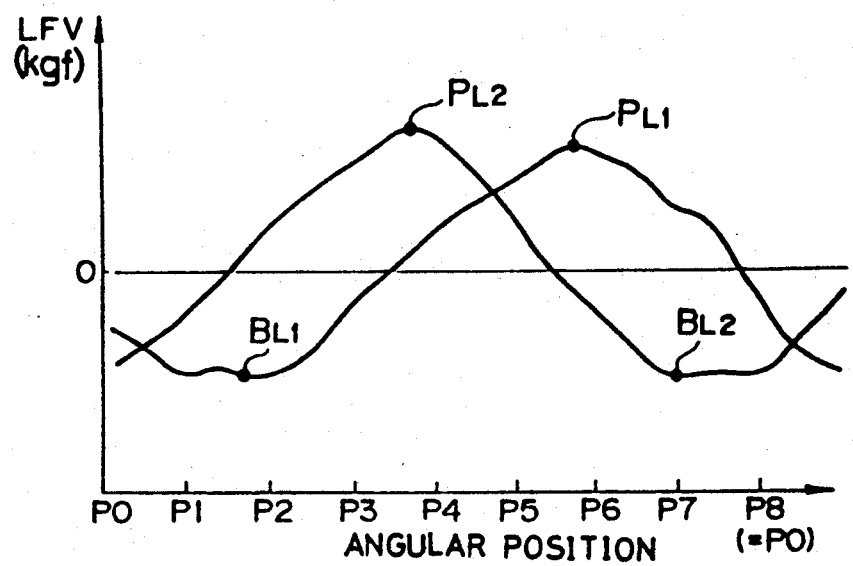
FIG. 2A is a graph showing relationship between the LFV measured by the measurement apparatus and angular positions of the tire.
Figure 2B:
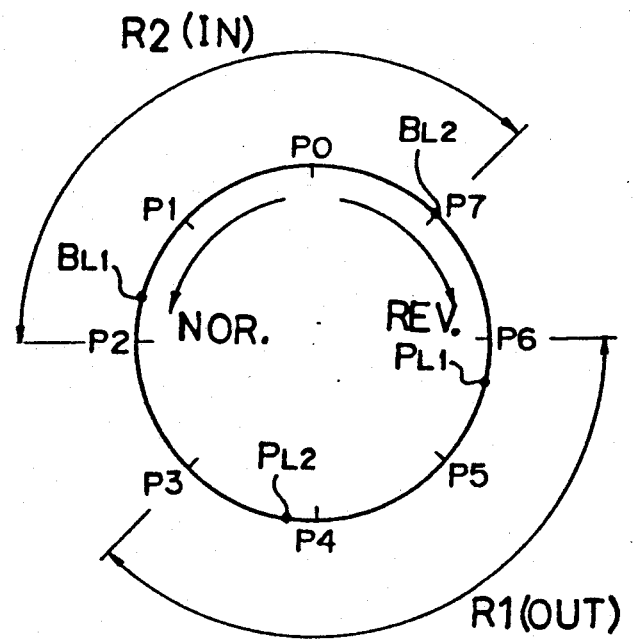
FIG. 2B is a diagram showing relationship between the angular positions of the tire and regions to be buffed.

FIG. 2A shows an example of a relationship between the angular position of the tire shown in FIG. 2B and the LFV measured by the foregoing apparatus. In this figure, PL1, BL1 indicate maximum and minimum LFVs when the tire is rotated in the normal direction while PL2, BL2 indicate maximum and minimum LFVs when the tire is rotated in the reverse direction. In this embodiment, the surface of the tire is marked at points corresponding to these extreme values. The LFV of the tire can be reduced in the following manner. Buffing is applied to an outer portion of the tire surface in a first region R1 including positions corresponding to the maximum values PL1, PL2, i.e., a region defined by the angular positions P3 and P6 in FIG. 2B. Buffing is also applied to an inner portion of the tire surface in a second region R2 including positions corresponding to the minimum values BL1, BL2, i.e., a region defined by the angular positions P2 and P7 in FIG. 2B. Hereafter, buffing the first region R1 is referred to as first buffing while buffing the second region R2 is referred to as second buffing. Further, it should be understood that the terms "inner" and "outer" respectively refer to directions towards the inside and the outside of a vehicle with respect to the center line of the tire when the tire is mounted to the vehicle.

Next, there will be described where on the surface of the tire 10 buffing is in fact performed with reference to FIGS. 3A to 3C.

Figure 3A:
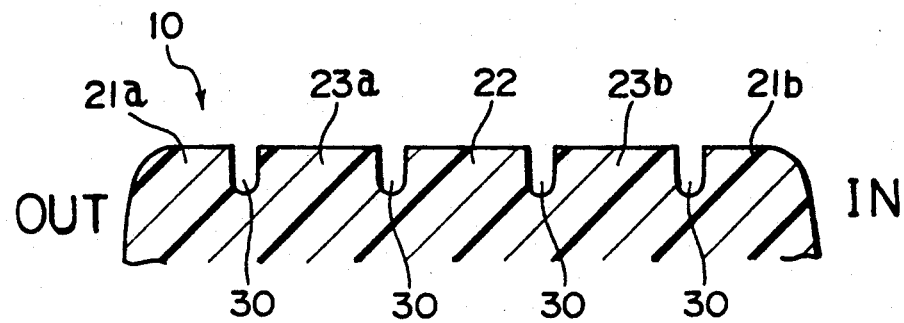
FIG. 3A is a diagram showing a cross-section of a surface portion of a tire having five ribs formed on the surface thereof.

The tire shown in FIG. 3A has four drainage grooves extending in the circumferential direction of the tire 10 with two adjacent grooves being kept at a specified spacing. Thereby, outer and inner shoulder ribs (ribs at the shoulders of the tread) 21a, 21b are respectively formed on the left and right side ends of the tread in the drawing of FIG. 3A; a center rib 22 is formed on the center line of the tread; and outer and inner middle ribs 23a, 23b are formed respectively between the outer shoulder rib 21a and the center rib 22 and between the center rib 22 and the inner shoulder rib 21b. In the case where the tire 10 has a cross-section as shown in FIG. 3A, the first buffing is performed on the outer middle rib 23a, whereas the second buffing is performed on the inner middle rib 23b.

Figure 3B:
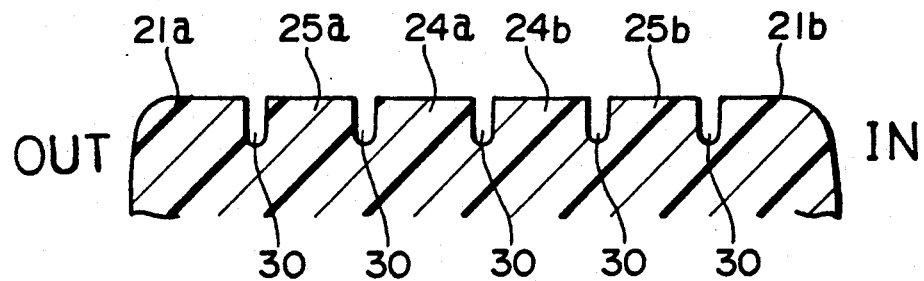
FIG. 3B is a diagram showing a cross-section of a surface portion of a tire having six ribs formed on the surface thereof.

The tire shown in FIG. 3B has five drainage grooves extending in the circumferential direction of the tire 10 with two adjacent grooves being kept at a specified spacing. Thereby, outer and inner shoulder ribs 21a, 21b continuous in the circumferential direction are respectively formed on the left and right side ends of the tread in the drawing of FIG. 3B; and outer and inner first middle ribs 24a, 24b, outer and inner second middle ribs 25a, 25b are formed between the outer and inner shoulder ribs 21a, 21b. The first middle ribs 24a, 24b are located more toward the center line of the tire surface. In the case where the tire 10 has a cross-section as shown in FIG. 3B, the first buffing is performed on at least either one of the outer first and second middle ribs 24a, 25a, whereas the second buffing is performed on at least one of the inner first and second middle ribs 24b, 25b. For instance, if the first buffing is performed on the outer first middle rib 24a, the second buffing is performed on the inner first middle rib 24b. If the first buffing is performed on the outer second middle rib 25a, the second buffing is performed on the inner second middle rib 25b.

Figure 3C:
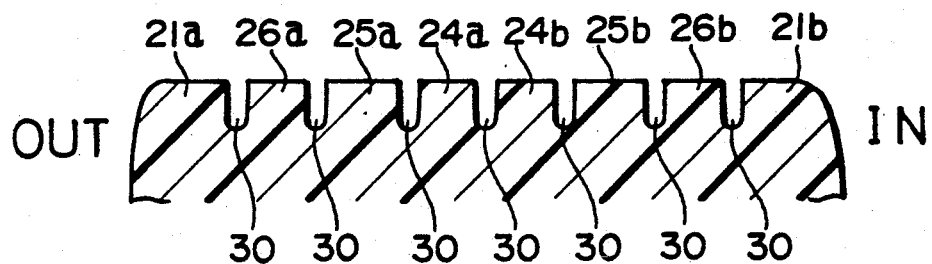
FIG. 3C is a diagram showing a cross-section of a surface portion of a tire having eight ribs formed on the surface thereof.

The tire shown in FIG. 3C has seven drainage grooves extending in the circumferential direction of the tire 10 with two adjacent grooves being kept at a specified spacing. Thereby, outer and inner shoulder ribs 21a, 21b are respectively formed on the left and right side ends of the tread in the drawing of FIG. 3C; and outer and inner first middle ribs 24a, 24b, outer and inner second middle ribs 25a, 25b, outer and inner third middle ribs 26a, 26b are formed between the outer and inner shoulder ribs 21a, 21b. The first, second and third middle ribs are located more toward the center line of the tire surface in this order. In the case where the tire 10 has a cross-section as shown in FIG. 3C, the first buffing is performed on at least one of the outer first, second and third middle ribs 24a, 25a, 26a, whereas the second buffing is performed on the inner middle rib(s) corresponding to the buffed outer middle rib(s). It is preferable that the first and second regions R1, R2 shown in FIG. 2B be spaced away from each other by 1/16 or greater circumference (22.5° or greater in angle) of the tire.

Figure 4:
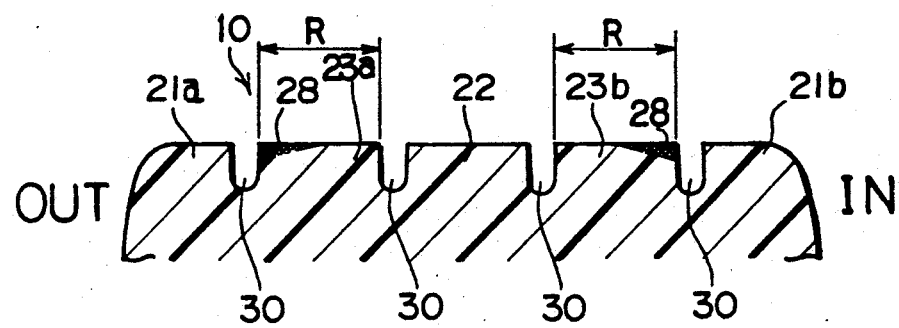
FIG. 4 is a diagram showing a cross-section of a surface portion of a tire after buffing in accordance with the invention is performed as an example.
Figure 6:
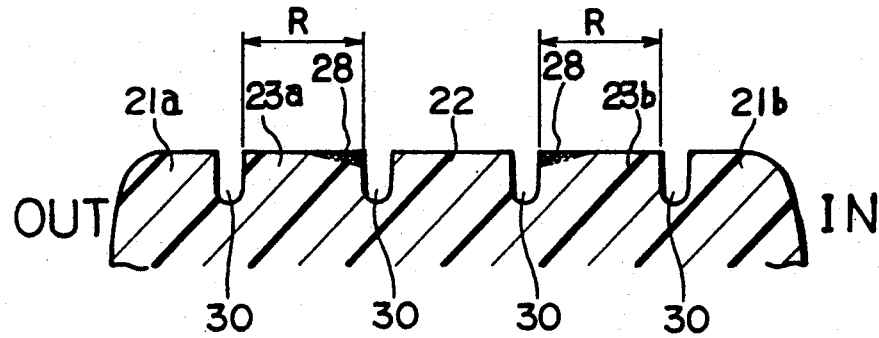
FIG. 6 is a diagram showing a cross-section of a surface portion of a tire after buffing in accordance with the invention performed as another example.

The middle rib may be buffed in a desired manner. However, the LFV of the tire can be effectively reduced, as shown in FIG. 4, by polishing out slantingly an outer edge and an inner edge of the outer and inner middle ribs to be buffed, i.e., by polishing out a crisscrossed section 28. In this case, it is preferable to set a buffing width D (width of the section to be buffed) to ($\frac{1}{2}$)R or shorter on the assumption that the width of the rib is R. Further, it is desirable to set a buffing angle, which is an angle formed between the surface of the rib before the buffing is performed and the slanting surface of the buffed rib, within a range of 3° to 8°. By setting the buffing angle within the above range, the LFV of the tire 10 can be effectively reduced without impairing the appearance thereof. Further, it may be appropriate to buff a crisscrossed section 28 on an inner edge of the outer middle rib 23a in place of the outer edge thereof as shown in FIG. 6. In this case, the second buffing is performed on an outer edge of the inner middle rib 23b.

Figure 7:
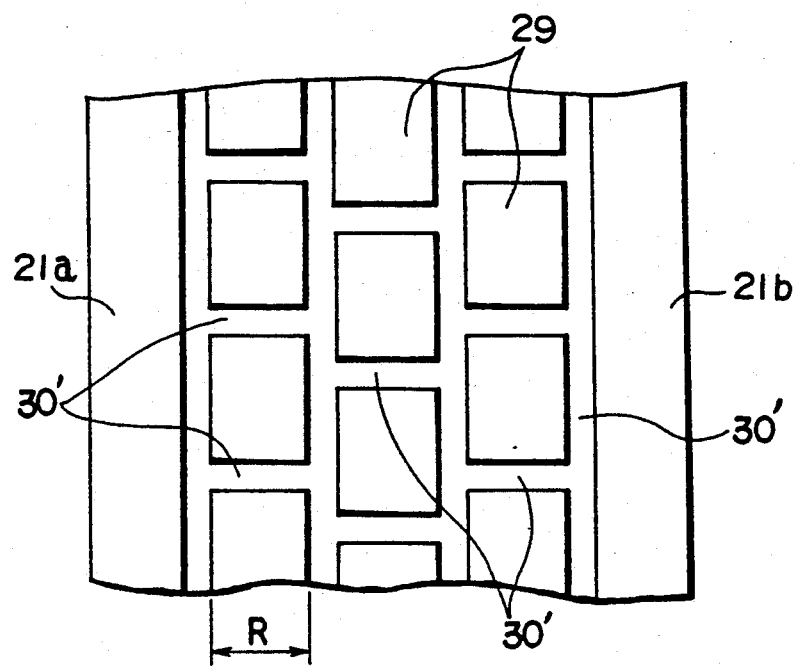
FIG. 7 is a front view showing a portion of the surface of a tire having block-shaped projections.
Figure 8:
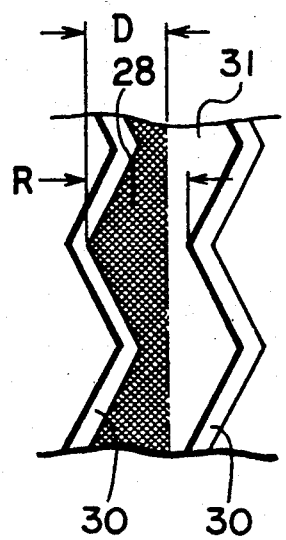
FIG. 8 is a front view showing a rib defined between zig-zag drainage grooves.

In the case where blocks 29 defined by longitudinal and lateral drainage grooves are projectingly formed on the tire surface as shown in FIG. 7 instead of the foregoing continuous middle ribs extending in the circumferential direction, the same effect is obtainable by buffing the blocks 29 in the manner in accordance with the invention. Likewise, in the case where middle ribs 31 defined by zigzag drainage grooves 30 are formed on the tire surface as shown in FIG. 8, the same effect is obtainable by buffing a specified section, e.g., a crisscrossed section 28 in FIG. 8 in the manner in accordance with the invention.

With the method described above, the LFV of the tire 10 can be effectively reduced almost without changing the RFV thereof as will be apparent from experimental data shown below.

EXPERIMENTAL DATA

Figure 5:
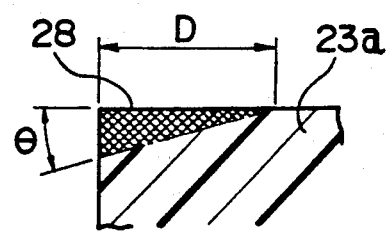
FIG. 5 is a diagram showing an enlarged cross-section of a buffed section of the rib.

The inventors of the present invention and their colleagues studied changes in the RFV and LFV in the following two cases: 1) only the shoulder ribs are buffed as in the conventional method; and 2) only the middle ribs are buffed as in the method of the invention. As a result of the above studies, data shown in TABLE-1 below were obtained. Tires used in an experiment were those having five ribs as shown in FIG. 3A, five tires in total for each case. The shoulder ribs 21a, 21b were buffed according to the conventional method, whereas the middle ribs 23a, 23b were buffed according to the method of the invention. Further, every buffing condition was set equally between the two cases except the ribs to be buffed, and the buffing width D and buffing angle were set equal to those shown in FIG. 5.

TABLE-1

| SAMPLE NO. | RFV BEFORE | RFV AFTER | LFV1 BEFORE | LFV1 AFTER | LFV2 BEFORE | LFV2 AFTER |
| --- | --- | --- | --- | --- | --- | --- |
| CON. 1 | 6.7 | 6.8 | 9.7 | 7.9 | 7.7 | 7.1 |
| CON. 2 | 9.3 | 11.8 | 10.0 | 8.9 | 3.5 | 3.7 |
| CON. 3 | 7.3 | 9.6 | 10.1 | 8.7 | 5.1 | 4.4 |
| CON. 4 | 5.8 | 8.3 | 10.2 | 8.8 | 7.4 | 7.6 |
| CON. 5 | 6.1 | 9.1 | 10.3 | 8.4 | 7.9 | 7.6 |
| INV. 1 | 5.3 | 5.1 | 10.7 | 8.1 | 12.0 | 9.8 |
| INV. 2 | 5.8 | 5.7 | 12.1 | 7.6 | 12.5 | 8.4 |
| INV. 3 | 11.0 | 10.9 | 12.3 | 11.4 | 9.5 | 8.4 |
| INV. 4 | 4.1 | 4.3 | 9.5 | 6.8 | 10.6 | 8.5 |
| INV. 5 | 4.1 | 4.2 | 10.4 | 7.8 | 10.9 | 8.9 |

(Unit: kgf)

Tire size: 185/70R14 five ribbed pattern
Buffing width: (2/3)R where R is a width of the rib
Buffing angle: 5°
Conditions in measuring LFV: Standards specified by JASO (Japan Automobile Standard Organization)

In TABLE-1, LFV1 denotes a lateral force variation when the tire is rotated in the normal direction while LFV2 denotes a lateral force variation when the tire is rotated in the reverse direction.

As will be apparent from TABLE-1, a reduction in the LFV causes an increase in the RFV when the conventional method is adopted. Accordingly, the conventional method suffers the disadvantage that the previously corrected RFV decreases in the case where the LFV is corrected after the correction of the RFV and, in the worst case, the RFV may have to be corrected again. However, when the method of the invention is adopted, the LFV can be effectively reduced almost without changing the RFV. Further, the LFV of the tire can be reduced more according to the method of the invention than according to the conventional method.

The present invention is not limited to the foregoing embodiment, but may also be embodied as follows.

(1) In the foregoing embodiment, the LFV of the tire is measured in both cases where the tire is rotated in the normal direction and in the reverse direction, and two regions including the points corresponding to the extreme values obtained in the both cases are buffed on the specified ribs. However, according to the invention, it may be sufficient to measure the LFV of the tire either when it is rotated in the normal direction or when it is rotated in the reverse direction and to correct the LFV based on the measurement results. Yet, it will be advantageous if the LFV of the tire be corrected in accordance with the measurement results obtained in the both cases, for there will be no restriction on which side of the tire should be faced outside or inside when the tire is mounted to a vehicle body. In other words, the tire can be mounted to the vehicle body in either direction. Particularly, it will be efficient if, as described in the foregoing embodiment, the two regions, the one including the points corresponding to the two maximum values of the LFV and the other including the points corresponding to the two minimum values of the LFV obtained in the two cases, are buffed. This is because the LFV of the tire can be corrected at one time for the both cases.

(2) Buffed in the foregoing embodiment are the regions of the ribs including the points corresponding to the maximum and minimum values of the LFV while the tire is rotated. However, according to the invention, the rib may be buffed in a region corresponding to either the maximum or minimum values of the LFV.

(3) The present invention does not specify means for scouring projections formed on the tire surface. Besides the buffing, the projections may be scoured by means of grinding.

As described above, according to the method of the present invention, a variation in lateral force exerted on a contact area of a tire is measured while the tire is rotated in at least one of a normal direction and a reverse direction. Out of projections formed on the surface of the tire, scouring is performed on at least one of the projections which satisfy the following conditions: 1) located on the side of the tire surface corresponding to a direction in which the lateral force varies; and 2) located neither on a center line of a tire tread nor most outwardly with respect to the center line of the tire tread. Accordingly, a lateral force variation of the tire can be reduced more effectively according to the method of the invention than according to the conventional method almost without changing a radial force variation of the tire.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method for improving a uniformity level of a tire having a plurality of projection lines arranged substantially parallel to a plane perpendicular to a rotational axis of the tire over a circumferential surface thereof, the method comprising the steps of:

measuring a variation in lateral force exerted on a contact area of the tire while the tire is rotated in at least one of a forward direction and a reverse direction;

determining two regions at a surface of the tire, one region including at least one position where the lateral force variation becomes maximum and the other region including at least one position where the lateral force variation becomes minimum based on the measured lateral force variation; and scouring over the determined two regions on at least one of the plurality of projection lines for each half of the tire surface divided by a center line thereof around an outer circumference of the tire, which satisfies the following conditions: 1) located on the side of the tire surface corresponding to a half direction in which the lateral force varies, and 2) located between the center line of the tire surface and an outermost one of said plurality of projection lines of the tire surface.

2. The method as defined in claim 1, wherein the one region includes two positions where the lateral force variation becomes maximum and the other region includes two positions where the lateral force variation becomes minimum when the variation in lateral force is measured in two cases where the tire is rotated in the forward direction and in the reverse direction.

3. The method as defined in claim 1, wherein the one region and the other region are spaced apart from each other by a circumferential distance of at least 1/16 of a circumference of the tire.

4. The method as defined in claim 1, wherein the projection lines to be scoured have two edges including first edges located toward the center line of the tire surface and second edges located away from the center line of the tire and wherein first edges or second edges of the projection lines are scoured over two determined regions.

5. The method as defined in claim 4, wherein the edges of the projection lines are slantingly scoured.

6. The method as defined in claim 5, wherein the width of a section to be scoured out is set to half the width of one of the projection lines.

7. The method as defined in claim 5, wherein an angle formed between a circumferential surface of a projection line before scouring is performed and a slanting surface of the scoured projection line is set within a range of 3° to 8°.

8. The method as defined in claim 1, wherein the projection lines are ribs extending continuously in a circumferential direction of the tire surface.

9. The method as defined in claim 1, wherein the projection lines are blocks defined by longitudinal and lateral drainage grooves and projectingly formed on the tire surface.

10. The method as defined in claim 8, wherein the projection lines are ribs defined by zigzag drainage grooves.

11. A method for improving surface uniformity of a tire having a plurality of projection lines arranged over a circumferential surface of the tire, the method comprising the steps of:

measuring a variation in lateral force exerted on a contact area of the tire while the tire is rotated in at least one of a forward direction and a reverse direction;

determining two regions at a surface of the tire, one region including at least one position where the lateral force variation becomes maximum and the other region including at least one position where the lateral force variation becomes minimum based on the measured lateral force variation; wherein the one region includes two positions where the lateral force variation becomes maximum and the other region includes two positions where the lateral force variation becomes minimum when the variation in lateral force is measured in two cases where the tire is rotated in the forward direction and in the reverse direction; and scouring over the two determined regions on at least one of the plurality of projection lines for each half of the tire surface divided by a center line thereof around an outer circumference of the tire, which satisfies the conditions of 1) being located on the half of the tire surface corresponding to a direction in which the lateral force varies, and 2) located between the center line and an outermost one of said plurality of projection lines of the tire surface.

12. The method as defined in claim 11, wherein the one region and the other region are spaced apart from each other by a circumferential distance of at least 1/16 of to a circumference of tire.

13. The method as defined in claim 11, wherein the projection lines to be scoured have two edges including first edges located toward the center line of the tire surface and second edges located away from the center line of the tire and wherein first edges or second edges of the projection lines are scoured over two determined regions.

14. The method as defined in claim 13, wherein the edges of the projection lines are slantingly scoured.

15. The method as defined in claim 14, wherein the width of a section to be scoured out is set to half the width of one of the projection lines.

16. The method as defined in claim 14, wherein an angle formed between a circumferential surface of a projection line before scouring is performed and a slanting surface of the scoured projection line is set within a range of 3° to 8°.

17. The method as defined in claim 11, wherein the projection lines are ribs extending continuously in a circumferential direction of the tire surface.

18. The method as defined in claim 11, wherein the projection lines are blocks defined by longitudinal and lateral drainage grooves and projectingly formed on the tire surface.

19. The method as defined in claim 17, wherein the projection lines are ribs defined by zigzag drainage grooves.

* * * * *